US010173734B2

(12) United States Patent
Ferauche et al.

(10) Patent No.: US 10,173,734 B2
(45) Date of Patent: Jan. 8, 2019

(54) PLASTIC PANEL ATTACHMENT JOINT FOR FASCIA TO FENDER EXECUTION

(71) Applicant: FORD MOTOR COMPANY BRASIL LTDA., Sao Bernardo do Campo (BR)

(72) Inventors: Victor Ferauche, Sao Bernardo do Campo (BR); Rubens Faria, Sao Bernardo do Campo (BR)

(73) Assignee: Ford Motor Company Brasil LTDA, Sao Paulo (BR)

( * ) Notice: Subject to any disclaimer, the term of this patent is extended or adjusted under 35 U.S.C. 154(b) by 254 days.

(21) Appl. No.: 15/187,370

(22) Filed: Jun. 20, 2016

(65) Prior Publication Data

US 2016/0288748 A1  Oct. 6, 2016

Related U.S. Application Data

(62) Division of application No. 14/570,542, filed on Dec. 15, 2014, now Pat. No. 9,371,094.

(51) Int. Cl.
*B62D 27/06* (2006.01)
*F16B 43/02* (2006.01)
(Continued)

(52) U.S. Cl.
CPC ......... *B62D 27/065* (2013.01); *B62D 27/023* (2013.01); *B62D 65/02* (2013.01);
(Continued)

(58) Field of Classification Search
CPC ..... B60R 2019/1886; B60R 2011/0052; B60R 2011/0066; B60R 19/18; B62D 27/065;
(Continued)

(56) References Cited

U.S. PATENT DOCUMENTS 3,875,661 A    4/1975  Lidstrom et al.
4,145,077 A *  3/1979  Haberle ............... B60R 19/26
                                             293/102
(Continued)

FOREIGN PATENT DOCUMENTS

DE    102006015399 A1    10/2007

OTHER PUBLICATIONS

English machine translation of 102006015399.

*Primary Examiner* — Matthew P Travers
(74) *Attorney, Agent, or Firm* — Jason Rogers; King & Schickli PLLC

(57) ABSTRACT

An attachment joint for attaching a first panel to a second panel includes a threaded bolt, a cooperating speed nut, and a support plate interposed between the speed nut and a surface of the first panel opposite a mating surface of the first panel. The support plate is configured to engage and support a contour formed in an edge of the first panel. A motor vehicle panel subassembly including a first panel having a mating surface and an opposed surface and including at least one contour formed in an edge thereof and a second panel having a cooperating mating surface and a cooperating edge contour is assembled using the described attachment joint. The first panel may be a plastic motor vehicle fascia and the second panel may be a metal motor vehicle body panel such as a fender.

15 Claims, 1 Drawing Sheet

(51) Int. Cl.
*F16B 5/02* (2006.01)
*B62D 65/02* (2006.01)
*B62D 27/02* (2006.01)
*B60R 19/18* (2006.01)

(52) U.S. Cl.
CPC ............. *F16B 5/025* (2013.01); *F16B 43/02* (2013.01); *B23P 2700/50* (2013.01); *B60R 19/18* (2013.01); *B60R 2019/1886* (2013.01)

(58) Field of Classification Search
CPC ...... B62D 65/16; B62D 27/023; B62D 65/02; F16B 5/025; F16B 43/02–43/025; F16B 5/02; Y10T 29/49952; Y10T 29/49622; Y10T 29/49948; B23P 11/00; B23P 2700/50

See application file for complete search history.

(56) References Cited

U.S. PATENT DOCUMENTS

| | | |
|---|---|---|
| 4,215,873 A | 8/1980 | Price |
| 4,448,565 A | 5/1984 | Peterson |
| 4,492,217 A | 1/1985 | Scheidler |
| 4,573,733 A | 3/1986 | Zaydel |
| 4,597,153 A | 7/1986 | Zaydel |
| 4,877,279 A | 10/1989 | Logan |
| 4,912,826 A | 4/1990 | Dixon et al. |
| 4,941,804 A | 7/1990 | Sarpy, Jr. |
| 4,973,102 A | 11/1990 | Bien |
| 5,029,920 A | 7/1991 | Furuta et al. |
| 5,048,868 A | 9/1991 | Arenhold |
| 5,080,412 A | 1/1992 | Stewart et al. |
| 5,226,695 A | 7/1993 | Flint et al. |
| 5,242,200 A | 9/1993 | Kamm et al. |
| 5,297,845 A | 3/1994 | Smartt et al. |
| 5,358,302 A | 10/1994 | Schoen et al. |
| 5,367,751 A | 11/1994 | DeWitt |
| 5,429,412 A | 7/1995 | Schoen et al. |
| 5,466,034 A | 11/1995 | Savage |
| 5,580,109 A | 12/1996 | Birka et al. |
| 5,846,018 A | 12/1998 | Frobosilo et al. |
| 6,010,169 A | 1/2000 | Cox et al. |
| 6,135,517 A | 10/2000 | Cordebar |
| 6,209,935 B1 | 4/2001 | Kavc et al. |
| 6,209,940 B1 | 4/2001 | Jocher et al. |
| 6,318,927 B1 | 11/2001 | Schafer et al. |
| 6,394,537 B1 | 5/2002 | DeRees |
| 6,598,924 B2 | 7/2003 | Palmer et al. |
| 6,612,087 B2 | 9/2003 | diGirolamo et al. |
| 6,641,191 B1 | 11/2003 | Berger et al. |
| 6,695,396 B1 | 2/2004 | Schwab |
| 6,715,764 B2 | 4/2004 | Delavalle et al. |
| 6,929,313 B2 | 8/2005 | Fries et al. |
| 7,086,679 B2 | 8/2006 | Andre et al. |
| 7,144,059 B2 | 12/2006 | Pfister et al. |
| 7,252,312 B1 | 8/2007 | Shen et al. |
| 7,488,032 B2 | 2/2009 | Thakar et al. |
| 7,540,550 B1 | 6/2009 | Huber et al. |
| 8,029,049 B2 | 10/2011 | Ito et al. |
| 8,375,654 B1 | 2/2013 | West et al. |
| 2004/0074048 A1 | 4/2004 | Danev |
| 2005/0062308 A1 | 3/2005 | Pfister et al. |
| 2005/0134068 A1 | 6/2005 | Pfister et al. |
| 2006/0012203 A1 | 1/2006 | Andre et al. |
| 2007/0284901 A1* | 12/2007 | Ball ............... B62D 27/065 296/29 |
| 2013/0017033 A1 | 1/2013 | Brown |

\* cited by examiner

PLASTIC PANEL ATTACHMENT JOINT FOR FASCIA TO FENDER EXECUTION

This application is a divisional patent application claiming priority to U.S. patent application Ser. No. 14/570,542, filed on 15 Dec. 2014, the full disclosure of which is incorporated herein in its entirety by reference.

TECHNICAL FIELD

This disclosure relates to attachment systems, and more particularly to an attachment joint for securing a plastic panel to a metal panel. The attachment joint includes a support plate for supporting a portion of the plastic panel during and after assembly, thereby reducing risk of damage to the plastic panel.

BACKGROUND

Modern motor vehicles include a variety of shaped panels manufactured of a variety of materials which are assembled to form the vehicle body. For structural and safety reasons, certain of the panels such as body panels are typically fabricated of metal or other similarly durable material. Other panels are often fabricated of rigid or semi-rigid plastics or other less durable materials, to provide savings in cost, weight, etc.

However, because of the differences in durability of the plastics materials comprising most vehicle fascia and the metals comprising most vehicle body panels such as fenders, during assembly damage to the plastic panel can occur. For example, motor vehicle plastic fascia and metal panels that will adjoin one to the other after assembly are fabricated to have matching mating surfaces, with a particular tolerance defined for the seam created between those mating surfaces. However, any deviation from a perfect mating surface can create a mismatch. As the plastic fascia panel is secured to the metal panel, any such mismatch may cause the plastic panel to deform as axial clamping force is applied to secure the plastic panel to the metal panel, damaging the plastic panel.

Incorporating a gap or seam of greater width (increased tolerance) between the plastic panel and the metal panel on assembly might partially solve the problem of damage to the plastic panel during assembly, but would create aesthetic concerns and at least a perception of reduced quality of manufacture. Moreover, such a wider gap or seam would allow increased play between the plastic panel and the metal panel as the plastic panel flexes and deforms during motor vehicle use, increasing the risk of damage to the plastic panel post-assembly.

To solve these and other problems, the present disclosure describes a panel attachment joint for a motor vehicle. Advantageously, the disclosed attachment joint provides a simple, robust structure for securing a plastic panel to a metal panel, for example for attaching a plastic fascia panel to a metal vehicle body panel such as a fender. By the disclosed attachment joint, risk of damage to the less durable plastic panel is incurred during the process of securing that plastic panel to the metal panel as the motor vehicle body is assembled. In turn, a tighter tolerance in the seam between the plastic panel and the metal panel is made possible providing a more closely matching mating surface, reducing risk of damage to the plastic panel post-assembly, and providing a more aesthetically pleasing appearance to the seam between the plastic panel and the metal panel.

SUMMARY

In accordance with the purposes and benefits described herein, an attachment joint is provided for attaching a first panel to a second panel, including a threaded bolt, a cooperating speed nut, and a support plate interposed between the speed nut and a surface of the first panel opposite a mating surface of the first panel. The support plate is configured to engage and support a contour formed in an edge of the first panel.

In embodiments, the support plate is an angled bracket having an axial end configured to engage and support the first panel edge contour. The first panel and the second panel respectively include at least one apertured cooperating receiver and boss for receiving the bolt there through. A plurality of apertured cooperating receivers and bosses may be provided in the first and second panels.

In another aspect, a motor vehicle panel subassembly is provided, including a first panel having a mating surface and an opposed surface and including at least one contour formed in an edge thereof and a second panel having a cooperating mating surface and a cooperating edge contour. The first panel and the second panel are attached at the mating surfaces using the attachment joint described above, by way of at least one pair of aligned apertures defined through at least one receiver formed in the first panel and at least one cooperating boss formed in the second panel. A plurality of apertured cooperating receivers and bosses may be provided in the first and second panels.

In yet another aspect, a method for providing a motor vehicle panel subassembly is described, including providing first and second panels and an attachment joint as described above, and securing the first panel to the second panel using the described attachment joint. The provided support plate engages and supports the first panel at an edge contour thereof. The described attachment joint secures the first panel to the second panel by way of at least one pair of aligned apertures respectively through at least one receiver formed in the first panel and at least one cooperating boss formed in the second panel. A plurality of aligned apertures and cooperating receivers and bosses as described may be provided in the first and second panels.

The described attachment joint and methods are used to provide a subassembly including a plastic panel such as a motor vehicle fascia attached to a metal panel such as a motor vehicle body panel. However, alternative uses are contemplated.

In the following description, there are shown and described embodiments of the disclosed motor vehicle panel attachment joint. As it should be realized, the attachment joint is capable of other, different embodiments and its several details are capable of modification in various, obvious aspects all without departing from the attachment joint as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle panel attachment joint, and together with the description serve to explain certain principles thereof. In the drawing:

FIG. 1 shows a plastic fascia panel secured to a metal vehicle fender panel, including an irregular gap in the mating surface there between;

Reference will now be made in detail to embodiments of the disclosed attachment joint, examples of which are illustrated in the accompanying drawing figures.

DETAILED DESCRIPTION

Figure 1:
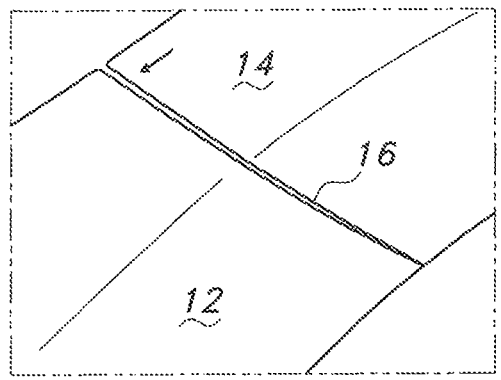

Reference is now made to FIG. 1 illustrating a plastic fascia panel 12 secured to a metal vehicle panel 14, in the depicted embodiment being a fender panel. A seam 16 is defined between the plastic panel 12 and the metal vehicle panel 14. In the depicted embodiment, a conventional fastening system (not shown) secures one panel to another, often resulting in an irregular seam 16, particularly at an outer end of the seam 16 (see arrow).

Figure 2:
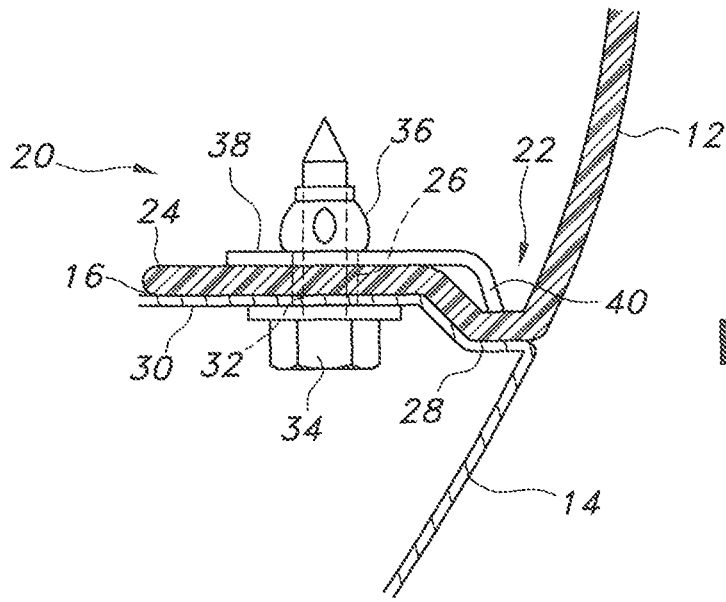
FIG. 2 depicts an attachment joint according to the present disclosure.

To solve this problem, as shown in FIG. 2 there is provided an attachment joint 20. As depicted, plastic panel 12 includes a contour 22 defined in an edge portion thereof. In addition to the contour 22, at least one receiver 24 is formed in an adjacent portion of the plastic panel 12. An aperture 26 is defined through the receiver 24.

A cooperating mating surface 28 is formed in a mating surface of the metal panel 14. Likewise, at least one cooperating boss 30 is formed in the metal panel 14, adapted to be received in the at least one receiver 24. An aperture 32 is defined through the boss 30, whereby aperture 32 is aligned with aperture 26 when boss 30 is received in receiver 24.

A threaded bolt 34 and a cooperating speed nut 36 are provided to bias plastic panel 12 and metal panel 14 together as shown. As is known, speed nuts are a type of locknut serving as both a lock washer and a nut. Any suitable speed nut as is known in the art is contemplated for use in the attachment joint 20 of this disclosure, including J-nuts, U-nuts, flat-style speed nuts, rivet nuts, and others.

Prior to securing speed nut 36 to bolt 34, a support plate 38 is interposed between the speed nut 36 and a surface of the plastic panel 12 opposite to a mating surface of the plastic panel 12. The support plate 38, which is may be fabricated of steel or any other suitable material, includes an angled axial end 40 configured to engage and support the portion of the plastic panel 12 defining the contour 22. The main body of the support plate 38 serves as a washer, preventing damage to plastic panel 12 when speed nut 36 is threaded onto bolt 34 to secure plastic panel 12 and metal panel 14 together. The angled axial end 40 provides support to the contour 22 portion of plastic panel 12, which would otherwise be free to flex and deform during and after assembly of the panels 12, 14. In that way, risk of damage to the plastic panel 12 during and after assembly is reduced.

Figure 3:
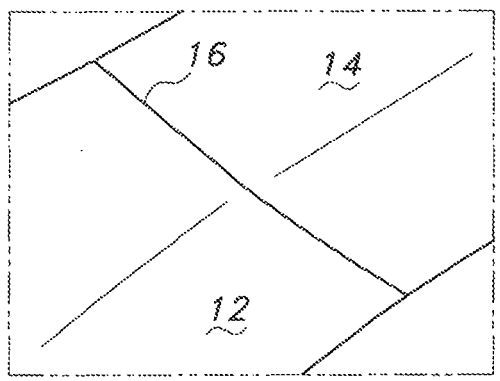
FIG. 3 shows a plastic fascia panel secured to a metal vehicle fender panel using the attachment joint of this disclosure.

As depicted in FIG. 3, this attachment joint 20 allows attaching a plastic panel 12 to a metal panel 14 to provide a seam 16 having a much narrower tolerance, improving fit and finish of the final product. The more flush appearance between plastic panel 12 and metal panel 14 created by a narrower seam 16 provides a more visually appealing and aesthetically pleasing appearance of the final motor vehicle body.

The foregoing disclosure has been presented for purposes of illustration and description. It is not intended to be exhaustive or to limit the embodiments to the precise form disclosed. Obvious modifications and variations are possible in light of the above teachings, and all such modifications and variations are within the scope of the appended claims when interpreted in accordance with the breadth to which they are fairly, legally and equitably entitled.

What is claimed:

1. A method for providing a motor vehicle panel subassembly, comprising:
   providing a first vehicle body panel having a mating surface and an opposed surface and including at least one contour formed in an edge thereof;
   providing a second vehicle body panel having a cooperating mating surface and a cooperating edge contour;
   providing a threaded bolt passing through at least one pair of aligned apertures defined through the first vehicle body panel and the second vehicle body panel;
   providing a cooperating speed nut;
   providing a support plate for interposing between the speed nut and the first vehicle body panel opposed surface, the support plate being configured to engage and support the first vehicle body panel edge contour; and
   securing the speed nut to the threaded bolt.

2. The method of claim 1, further including providing the support plate defining an angled bracket.

3. The method of claim 2, including providing the support plate having an axial end configured to engage and support the first vehicle body panel edge contour.

4. The method of claim 1, further including providing the at least one pair of aligned apertures respectively through at least one receiver formed in the first vehicle body panel and at least one cooperating boss formed in the second vehicle body panel.

5. The method of claim 4, further including providing a plurality of pairs of aligned apertures respectively through a plurality of receivers formed in the first vehicle body panel and a plurality of cooperating bosses formed in the second vehicle body panel.

6. The method of claim 1, further including providing the first vehicle body panel defining a plastic fascia and providing the second vehicle body panel defining a metal motor vehicle body panel.

7. A method for assembling a motor vehicle panel subassembly, comprising:
   providing a first vehicle body panel having a mating surface and an opposed surface;
   providing a second vehicle body panel having a cooperating mating surface;
   providing a threaded bolt passing through at least one pair of aligned apertures defined through the first vehicle body panel and the second vehicle body panel;
   providing a cooperating speed nut;
   providing a support plate for interposing between the speed nut and the first vehicle body panel opposed surface, the support plate being configured to engage and support the first vehicle body panel; and
   securing the speed nut to the threaded bolt.

8. The method of claim 7, including providing the first vehicle body panel having at least one contour formed in an edge thereof.

9. The method of claim 8, including providing the support plate configured to engage and support the first vehicle panel edge contour.

10. The method of claim 9, including providing the support plate having an axial end configured to engage and support the first vehicle body panel edge contour.

11. The method of claim 8, including providing the second vehicle body panel having a cooperating edge contour.

12. The method of claim 7, further including providing the support plate defining an angled bracket.

13. The method of claim 7, further including providing the at least one pair of aligned apertures respectively through at least one receiver formed in the first vehicle body panel and at least one cooperating boss formed in the second vehicle body panel.

14. The method of claim 13, further including providing a plurality of pairs of aligned apertures respectively through a plurality of receivers formed in the first vehicle body panel and a plurality of cooperating bosses formed in the second vehicle body panel.

15. The method of claim 7, further including providing the first vehicle body panel defining a plastic fascia and providing the second vehicle body panel defining a metal motor vehicle body panel.

\* \* \* \* \*